United States Patent
Hoffmann et al.

(10) Patent No.: US 7,243,070 B2
(45) Date of Patent: Jul. 10, 2007

(54) SPEECH RECOGNITION SYSTEM AND METHOD FOR OPERATING SAME

(75) Inventors: Gerhard Hoffmann, Eichenau (DE); Tobias Schneider, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 904 days.

(21) Appl. No.: 10/319,107

(22) Filed: Dec. 12, 2002

(65) Prior Publication Data
US 2003/0139922 A1    Jul. 24, 2003

(30) Foreign Application Priority Data
Dec. 12, 2001    (EP)    ............................ 01129647

(51) Int. Cl.
*G10L 15/00*    (2006.01)
(52) U.S. Cl. .................................... 704/251; 704/235
(58) Field of Classification Search ................ 704/235, 704/251
See application file for complete search history.

(56) References Cited

U.S. PATENT DOCUMENTS

| | | | |
|---|---|---|---|
| 5,212,730 A | 5/1993 | Wheatley et al. | |
| 5,732,187 A | 3/1998 | Scruggs et al. | |
| 5,774,860 A * | 6/1998 | Bayya et al. | 704/275 |
| 5,920,835 A * | 7/1999 | Huzenlaub et al. | 704/235 |
| 6,005,927 A | 12/1999 | Rahrer et al. | |
| 6,219,638 B1 * | 4/2001 | Padmanabhan et al. | 704/235 |
| 6,507,643 B1 * | 1/2003 | Groner | 379/88.14 |
| 2004/0062365 A1 * | 4/2004 | Agraharam et al. | 379/88.14 |

FOREIGN PATENT DOCUMENTS

| | | |
|---|---|---|
| DE | 197 51 123 C1 | 6/1999 |
| WO | WO 01/78245 A1 | 10/2001 |

* cited by examiner

*Primary Examiner*—Leonard Saint-Cyr
(74) *Attorney, Agent, or Firm*—Bell, Boyd & Lloyd LLP

(57) ABSTRACT

A speech recognition system and method are provided for the speech-controlled inputting of short messages into a telecommunications terminal, in particular a mobile phone or cordless phone, having a speech recognizer module which operates independently of the speaker, a text/phoneme converter module and/or an auxiliary speech recognition module which operates in a speaker-dependent fashion and has the purpose of converting the text inputs or text transfers into a phonetic script which is adapted to the speech recognition module, and a vocabulary control module for supplementing the vocabulary or for replacing elements of the vocabulary by words or phrases which have been input or transferred.

20 Claims, 2 Drawing Sheets

SPEECH RECOGNITION SYSTEM AND METHOD FOR OPERATING SAME

BACKGROUND OF THE INVENTION

The present invention relates to a speech processing system and method that are specifically tailored for creating short messages in, or for, a telecommunications terminal.

The mobile radio standard GMS which is currently valid defines framework conditions for the transmission of text messages with a limited length (short messages) via the mobile radio networks, for which the designation SMS (Short Messaging Service) has become widespread, even in everyday life. SMS messages have become established in GSM networks as a communication tool for conveying short pieces of information. The present invention makes it easier to input SMS messages on mobile terminals.

Despite the wide variety of possible ways of transmitting SMS messages from the Internet or via call centers and in spite of the fact that they can be created more easily on PCs or laptops, the overwhelming majority of all SMS messages which are sent today are created directly on mobile terminals. These SMS messages have to be input in a relatively complicated way with the existing twelve-key keypad. Even commercially established methods for reducing the number of key-pressing operations, such as Tegic T9, only make the SMS inputting operation easier and quicker to a certain degree. In addition, the use of the T9 mode requires a certain routine when creating the SMS message.

The above mentioned inputting operation using a PC or mobile computer is significantly easier owing to the keypad which can be operated in a significantly better way, and basically highly developed speech-processing systems are also suitable for using computers to input short messages via the PC. All these possibilities are, however, linked to the availability of an appropriate computer with complete alphanumeric keypad or the hardware and software resources for advanced speech processing. These resources are available to a very small number of SMS users in typical application situations.

The present invention is, therefore, directed toward making available an improved system and method for inputting SMS messages directly at a (in particular mobile) telecommunications terminal.

SUMMARY OF THE INVENTION

The present invention includes the fundamental idea of almost completely dispensing with the customary inputting of text in order to create short messages. It also includes the idea of replacing the inputting of text, irrespective of the very limited resources (processing and storage capacity) of a small hand-held telecommunications terminal, essentially by the voice-inputting operation which provides unparalleled ease and convenience for the user. The effect of the present invention is based on reducing the scope of the vocabulary to a size which is adequate for mobile terminals by utilizing preconfigurations and a self-learning system.

Accordingly, the present invention relates to methods or aspects of the speech-controlled inputting of SMS messages which can be used individually or in combination. It is, thus, concerned with the speech-controlled selection of predefined words/templates and the speech-controlled selection of word groups via speech instructions or metaphors and a self-learning system for configuring a speech recognizer with the SMS vocabulary used by the user.

Speech-Controlled SMS Templates

When creating SMS messages it is possible to input free texts. Completely inputting the message via speech would require a dictation system (with a vocabulary of ≧50,000 words) which operates without faults on the mobile terminal. Because of the limited resources on the terminals, it is not technically possible to input this at the moment. However, if it is considered that many of the items contained in SMS messages are similar, the actively used vocabulary is significantly reduced and it is often also possible to operate with prefabricated templates.

A speaker-independent speech recognizer is also implemented on the mobile terminal, the speech recognizer supporting only a limited number of words (for example, 1,000 words) in the active vocabulary owing to the resource restrictions. In the delivered state of the device, the speech recognition is preconfigured with the most important generally customary words in SMS messages such as, for example, "today", "yesterday", "tomorrow", "meet", "cinema", etc.

This preassigned information can be supplemented or modified individually by the user (while complying with a maximum number of supported words). The changes can be made, for example, independently of the speaker via text inputs and subsequent automatic conversion to the phonetic script which the recognizer can understand (text/phoneme conversion) or speaker-dependently via text inputs and subsequent annunciation of the term. In this way, the vocabulary to be supported can be individually personalized without obtaining the resource dimensions of a dictation system. The changes can, in particular, be carried out directly on the device or in a multi-stage fashion via a PC and downloaded to the telecommunications terminal.

Selection of Text Via Voice Metaphors

Instead of individual words, a voice instruction also can be used to call small texts, referred to as templates; such as, for example, "regards", "best wishes", "I'm coming", "are you coming", "I wanted to", "can you", "see you soon", etc. It is also possible to input metaphors for word groups; for example, "greeting" or "signing-off phrase". After these words have been recognized, a number of possible text variants on this metaphor are presented on the display. For example, "greeting" can then be followed by an offer of. "Good morning, hello, how are you . . . ". The user can select the desired entry via manual selection or via voice input (for example, of the respective place number). When this switch is accessed, the individual metaphors can be individually widened or adapted by the user.

Self-Learning Vocabulary Systems for Speech-Controlled Inputting of SMS

In order to adapt the standard vocabulary to the communications behavior of the user, an automatic, self-learning adaptation of the basic vocabulary can be influenced. For this purpose, depending on the settings, all transmitted and/or received messages are analyzed by the system. Words which were previously not known to the speech recognizer are converted via text-to-phoneme conversion which is present on the device into a form which the speech recognizer can understand, and included in the vocabulary. The vocabulary to be supported is restricted here to a maximum number of words which is adequate for embedded devices. If the maximum limit is reached, the active items of vocabulary can be adapted further via substitution strategies (for example, first-in-first-out (FIFO), prioritization according to the frequency of occurrence). As the items of vocabulary in the SMS messages for a specific user are generally relatively small, this process gradually gives rise to a personalized system which permits the user to input his/her SMS message almost completely by speech.

While the actual speech recognition module is preferably embedded as a hidden Markov model known per se (but configured with a resource requirement, adapted to the preconditions of a small hand-held electronic device) the text-phoneme converter module is preferably implemented on the basis of a neural network. The implementation of such converters on the basis of neural networks is known per se and, therefore, does not require any further explanation here for the person skilled in the art.

A "classic" input keypad, in particular an alpha-numeric keypad which is integrated into the device and has multiple assignment of keys, or a correspondingly embedded touch-screen is used to make the text inputs. It is also possible to make the text inputs using a plug-on supplementary keypad (which may be obtained from many manufacturers) or via a connected PC or laptop/notebook.

According to the above, a substitution control algorithm for replacing elements of the basic vocabulary by new words or templates, in particular as a function of the time and/or frequency of their occurrence at the text input interface, is implemented in the vocabulary control module. As a result, in the course of time, a vocabulary structure which is adapted as well as possible to the habits of the particular user and his/her communication partners is formed. On the other hand, it is also possible (using simpler hardware and software) to perform continuous updating of the vocabulary according to the FIFO principle; i.e., to eliminate from the vocabulary words which have not been used for a long time and, thus, continuously renew the vocabulary.

As is already clear from the above statements, not only words but also sequences of words (phrases) may be present as elements of the basic vocabulary and of the current vocabulary of the speech recognizer, and both types of element can be referred to in a summarizing fashion as "templates". The more pronounced the short-message communication of a user follows established rituals, the more efficient is the storage of entire phrases alongside individual words.

The word sequences are expediently logically linked to a speech instruction or a metaphor, the inputting of which by speech calls the word sequences during the operation of the system. Here, various phrases can be assigned to the same metaphor or the same speech instruction and can be displayed in reaction to an appropriate input so that the user can select the word sequence which is desired in the respective situation. This also can be carried out via a speech instruction, but also can be done conventionally by scrolling the display and pressing the "OK" key at the desired position.

From the explanations above it is apparent that a vocabulary memory of the speech recognizer can be expediently divided into a number of memory areas which can be addressed and handled separately. A first memory area for the basic vocabulary which is also supplied by the manufacturer, and its supplements or substitutes which are accumulated during the operation of the system is separated here from another memory area in which templates which are intentionally input by the user are stored. This latter memory area, in turn, cannot be overwritten by new entries in the first memory area, at any rate not by current inputs of the user.

Additional features and advantages of the present invention are described in, and will be apparent from, the following Detailed Description of the Invention and the Figures.

DETAILED DESCRIPTION OF THE INVENTION

Figure 1:
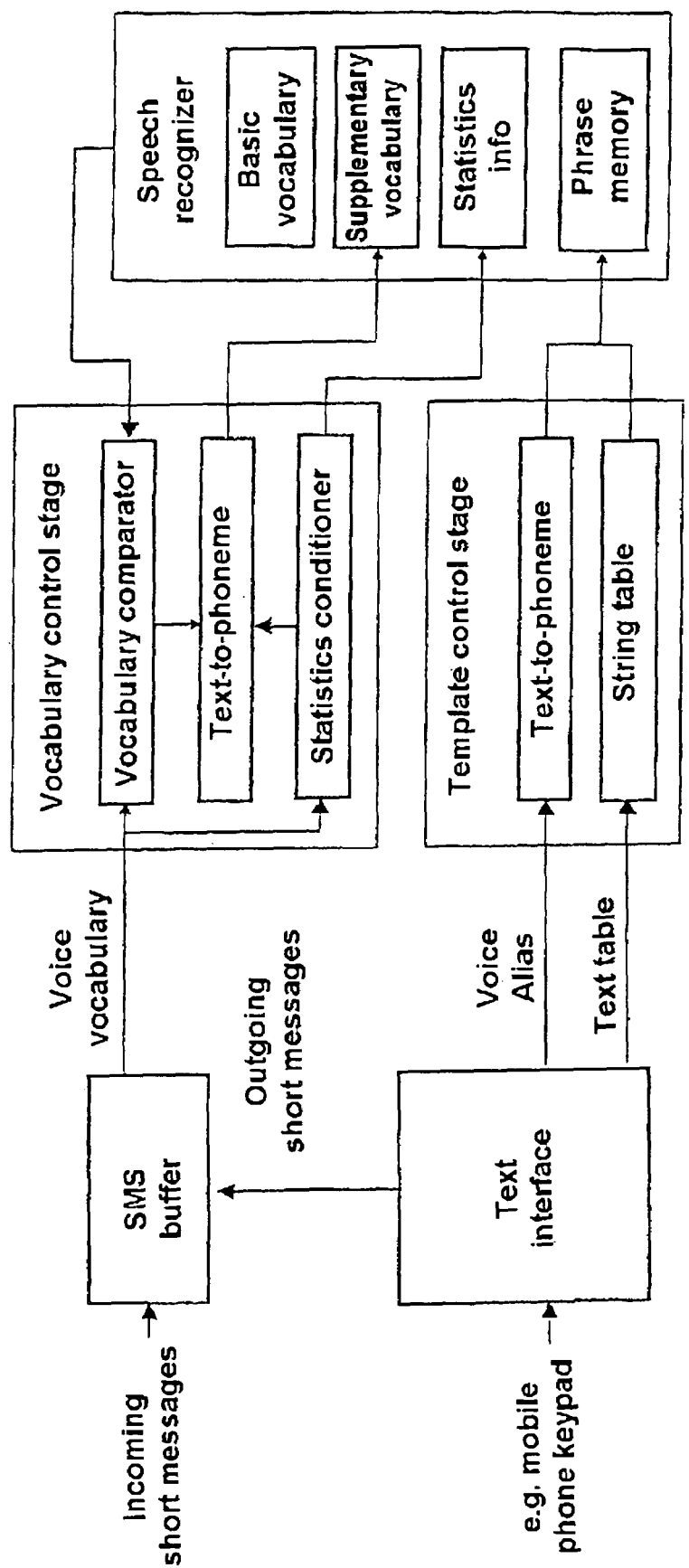
FIG. 1 is a basic view of key components of a speech recognition system according to the present invention.

As is apparent from FIG. 1, a vocabulary control stage, a template control stage, a text interface and an SMS buffer as well as the actual speech recognizer (with additional components in comparison with a conventional speech recognizer) can be considered as key components of a preferred speech recognition system according to the present invention. The system is connected via the text interface to a text input device; for example, a mobile phone keypad. Outgoing short messages which are created both via the keypad and the text interface and incoming text messages which are received via the mobile phone are fed to the SMS buffer. The text interface is connected on the output end to inputs of the template control stage; specifically, to a "text-to-phoneme" converter module and to a "string table" module. A voice alias or a text table are fed to these modules via the text interface and a phoneme sequence or a string table is generated therefrom. The latter are finally stored in a phrase memory of the speech recognizer.

The output of the SMS buffer is connected to a vocabulary comparator and a statistics conditioner within the vocabulary control stage. The latter are each connected at the output end to a further "text-to-phoneme" converter stage which itself is connected to a supplementary vocabulary memory in the speech recognizer. This statistics conditioning unit is also connected to a "statistics info" module in the speech recognizer in order to store statistical information there for the operation of the speech recognizer from the outgoing and incoming short messages.

The vocabulary comparator is connected via a further input to an output of the speech recognizer and receives therefrom the comparison basis for the evaluation of the current SMS for supplementing the vocabulary stored in the speech recognizer.

The method of operation of this speech recognizer is obtained from the general explanations above and from FIG. 1 itself so that no more wide ranging functional description is necessary here.

Figure 2:
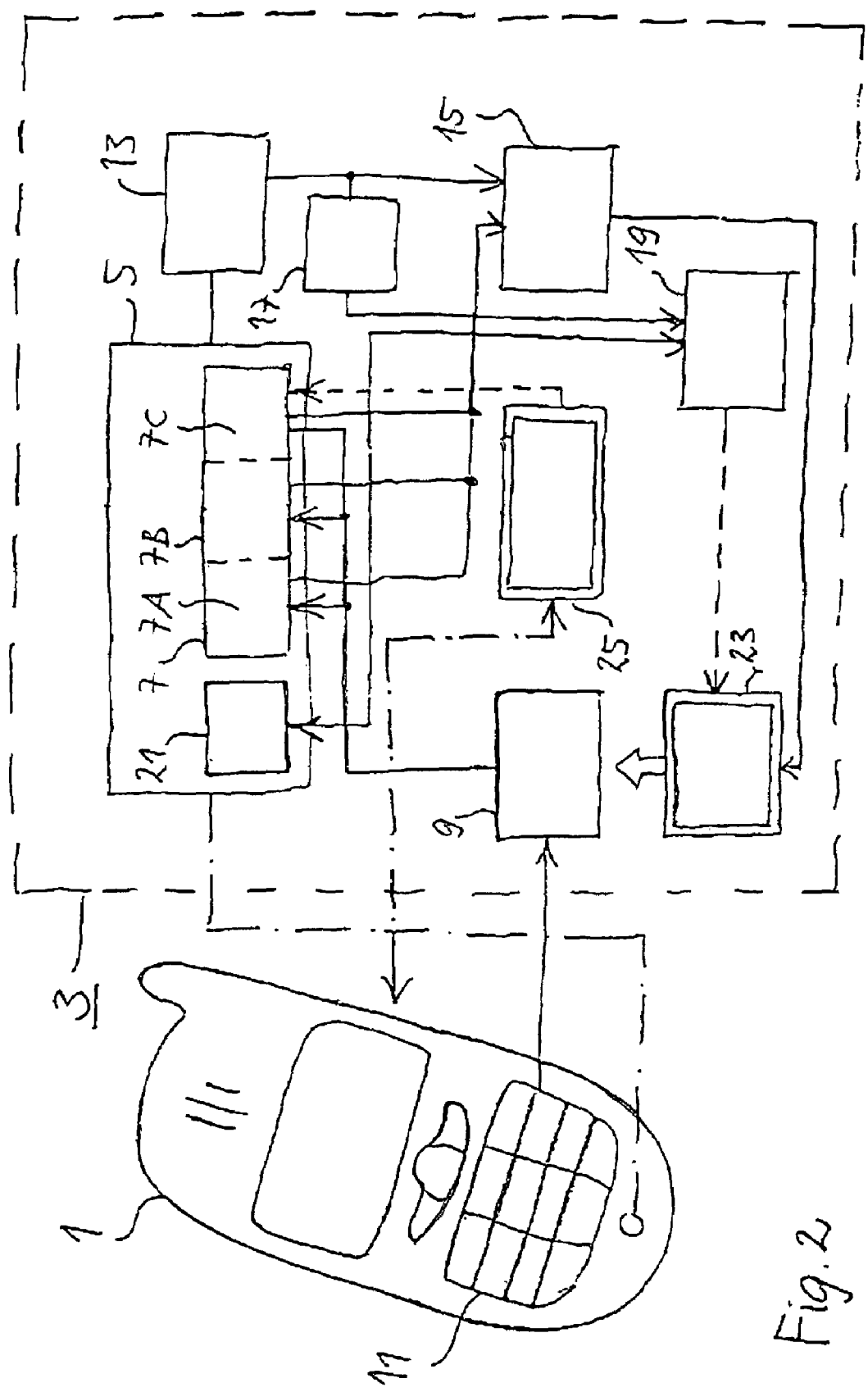
FIG. 2 is a schematic view of a speech recognition system, embodied as a component of a mobile phone, in an embodiment which is modified in comparison with FIG. 1.

The speech recognizer system 3 of a mobile phone 1 according to FIG. 2 includes an HMM speech recognizer 5 with low resource requirements and a vocabulary and phrase memory 7 which includes a basic memory area 7A, a supplementary vocabulary memory area 7B and a phrase memory area 7C. A basic vocabulary of the speech recognizer 5 is stored in invariant form in the basic memory area 7A; i.e., the elements of the vocabulary of the speech recognizer which are stored there can be neither deleted nor overwritten. In this example, both words which are newly input by the user via text inputting and words which are made available by the speech recognition system in the fashion described below are additionally stored in the supplementary vocabulary memory area 7B, the first-mentioned elements being identified as active inputs of the user via a flag, and also being non-deletable. When the mobile phone 1 is supplied, word sequences for standard situations in life, which the user can also incorporate in a short message in a fashion which is also described in more detail below, are already stored in the phrase memory area 7C (in assignment to a speech instruction or a metaphor in each case).

In order to implement the present invention, an HMM-based speech recognizer can be used which has, for example, a performance range of 1,000 words; for example, for the German language, which is therefore small enough to be able to run on embedded devices. The speech recognizer 5 is preconfigured for the German language for supply with 1,000 generally customary words. The words for the preassignment information are acquired here from the analysis of a large number of SMS messages which have been sent by many users.

Furthermore, the text/phoneme converter 9 based on a neural network which converts text inputs into the phonetic script necessary for the speech recognizer is implemented on the mobile phone 1. The speech recognizer enables the user to use the twelve-key keypad 11 of the mobile phone 1 to input, as text, words which he/she would like to store in the supplementary vocabulary memory area 7B, and makes the storable representation available.

Furthermore, the text/phoneme converter 9 permits a self-learning function to be implemented, for whose execution are provided a buffer 13 for temporarily storing the vocabulary of received and/or transmitted short messages, a vocabulary comparator unit 15, connected to the buffer 13 and to the vocabulary and phrase memory 7, for the purpose of comparing the respectively stored items of vocabulary, a statistical evaluation unit 17 for determining statistical characteristic variables of the words which have newly occurred in the received or transmitted short messages, and a characteristic-variable comparator unit 19 for comparing these characteristic variables with stored characteristic variables of the basic vocabulary. The characteristic variable comparator unit 19 is connected at the input end on the one hand to the evaluation unit 17 and on the other hand to a characteristic-variable memory 21 of the HMM speech recognizer 5 where relevant values of the elements of the basic vocabulary are stored. In order to control the updating of the vocabulary, a vocabulary control stage 23 is provided which itself receives control information from the vocabulary comparator unit 15 and the characteristic-variable comparator unit 19.

In order to automatically adapt/personalize the vocabulary, the user can actuate the self-learning function of the system. Here, both the analysis of incoming and outgoing SMS messages can be enabled. The activation of the analysis of incoming SMS messages is specifically interesting if the manual input functionality is highly restricted in the mobile terminal; for example, as in a clock mobile phone.

When the self-learning system is activated, all the words of each incoming and/or outgoing SMS message are compared with the existing basic vocabulary. If the SMS message contains words which are not in the basic vocabulary of the recognizer, they are added to the vocabulary according to a substitution strategy via text/phoneme conversion. For the substitution strategy, each word in the vocabulary is identified with the date of use and the frequency of use. Initial values are used for words which are preset at delivery. A word which is to be newly entered is substituted here for the word with the lowest frequency of use and the oldest date of use. This produces an individually personalized system on an incremental basis.

In addition, the user is provided with the possibility of creating his/her own individual templates via a template menu prompting system 25 and linking these templates to a voice instruction (voice alias). A template can be composed here of one or more words. For this purpose, the template text is input in table form and assigned to a voice alias (speech instruction), also input via the keypad 11, as text.

The text/phoneme converter 9 translates the voice alias and enters in the vocabulary of the speech recognizer; the template text itself is stored in the phrase memory area 7C and the speech instruction is stored in the supplementary vocabulary memory area 7B. The voice alias replaces a word of the vocabulary here in accordance with the already described substitution strategy.

The voice alias is identified as such. It is not subject to the substitution strategy as it represents an explicit user entry. It can only be deleted by the user himself/herself.

A number of template texts also can be assigned as a supplementary function to a voice alias. When the voice alias is called, all the template texts are made available for selection with a preceding number via the menu control system 23. The template selection is then carried out manually by selecting a key or by a voice input of the template number. For example, the voice alias "Greeting" could be linked to the template text "Best wishes" and "Yours sincerely". When "greeting" is spoken, the user is then presented with the text "1 Best wishes" and "2 Yours sincerely". The text "Yours sincerely" is then selected by subsequently speaking the template number "2".

In order to arrive at a balanced proportion between the basic vocabulary and user-defined templates, a maximum number of template entries is preset; for example, 100 user templates. The user can define his/her own voice aliases up to this maximum value, the voice aliases respectively substituting an entry from the existing basic vocabulary. If the maximum limit is reached, the user is provided with a corresponding warning message. The user can change the maximum template value via an option. In an extreme case, he/she can select the maximum value of 1,000 for the templates, which, when the maximum value is used, signifies eliminating the basic vocabulary and the analysis function.

Although the present invention has been described with reference to specific embodiments, those of skill in the art will recognize that changes may be made thereto without departing from the spirit and scope of the present invention as set forth in the hereafter appended claims.

The invention claimed is:

1. A speech recognition system for speech-controlled inputting of short messages into a telecommunications terminal, comprising:

a speech recognition module operating in a speaker-independent manner, in which a specific vocabulary for creating short messages is stored;

a text input interface for at least one of directly inputting text and transferring text from a short message;

at least one of a text and phoneme converter module, which is connected to the text input interface;

an auxiliary speech recognition module which operates in speaker-dependent fashion and converts the text into a phonetic script which is adapted to the speech recognition module;

a vocabulary control module for at least one of supplementing the vocabulary and replacing elements of the vocabulary by the text which has been one of input and transferred;

a message vocabulary buffer for temporarily storing the vocabulary of short messages which have been at least one of received and transmitted; and a vocabulary comparator unit, connected to both the message vocabulary buffer and the speech recognition module, for comparing the stored vocabulary items and for outputting to the vocabulary control module words which have newly occurred in the short messages.

2. A speech recognition system as claimed in claim 1, wherein at least one of the speech recognition module and the text/phoneme converter module is configured based on a neural network.

3. A speech recognition system as claimed in claim 1, wherein the text input interface has an alpha-numeric keypad integrated into the terminal with one of a multiple assignment of keys and an appropriately configured touch-screen.

4. A speech recognition system as claimed in claim 1, wherein a the speech recognition model comprises a hidden Markov model.

5. A speech recognition system as claimed in claim 1, wherein the vocabulary control module comprises a substitution control algorithm that replaces portions of the vocabulary with new text in accordance with a predetermined substitution strategy, wherein the substitution strategy is formed as a function of at least one of time and frequency of an occurrence at the text input interface.

6. A speech recognition system as claimed in claim 5, wherein the menu controller logically links in each case a plurality of phrases to a voice instruction, displays available phrases in reaction to the voice input of the voice instruction, and selects a currently desired phrase via an additional input operation.

7. A speech recognition system as claimed in claim 1, further comprising parts for implementing a menu control for user-specific logic linking of phrases to in each case at least one of one voice instruction and a metaphor.

8. A speech recognition system as claimed in claim 1, further comprising parts for storing at least one of one voice instruction and a metaphor as a representation of phrases in the vocabulary of the speech recognizer.

9. A speech recognition system as claimed in claim 1, further comprising:

a statistical evaluation unit for determining statistical characteristic variables of the newly occurred words; and a characteristic variable comparator unit for comparing the acquired statistical characteristic variables with correspondingly characteristic variables of words stored in the speech recognizer, and for outputting a decision signal, representing a comparison result, to an input of the vocabulary control module for initiating one of supplementation and substitution of the vocabulary of the speech recognizer in response to the comparison result.

10. A speech recognition system as claimed in claim 1, wherein the speech recognizer has a vocabulary and phrase memory with a plurality of memory areas, with at least a first memory area containing a non-variant basic vocabulary.

11. A speech recognition system as claimed in claim 10, wherein a second memory area of the vocabulary and phrase memory holds a predetermined maximum number of phrases and optionally assigned voice instructions.

12. A speech recognition system as claimed in claim 11, wherein words which are transferred from the vocabulary of short messages which have been at least one of received and transmitted are stored, without influencing the memory content of the second memory area, in one of the first memory area and a third memory area of the vocabulary memory.

13. A speech recognition system as claimed in claim 1, wherein the text input interface is an external interface to another speech recognition system.

14. A speech recognition system as claimed in claim 13, wherein the another speech recognition system is one of a PC and a mobile computer.

15. A method for operating a speech recognition system using speech-controlled inputting of short messages into a telecommunications terminal, comprising the steps of:

generating a specific vocabulary for creating short messages in a speech recognition module operating in a speaker-independent manner;

receiving, at a text input interface, at least one of directly inputted text and transferred text from a short message;

at least one of a text and phoneme converter module, which is connected to the text input interface;

converting the text into a phonetic script which is adapted to a speech recognition module that operates in speaker-dependent manner;

performing at least one of (a) supplementing the vocabulary, and (b) replacing elements of the vocabulary, by the text which has been one of input and transferred, in a vocabulary control module;

temporarily storing the vocabulary of short messages which have been at least one of received and transmitted in a message vocabulary buffer; and comparing the stored vocabulary items in a vocabulary comparator unit connected to both the message vocabulary buffer and the speech recognition module, and outputting to the vocabulary control module words which have newly occurred in the short messages.

16. A method for operating a speech recognition system as claimed in claim 14, wherein the directly inputted text comprises manual inputting of new words by a user.

17. A method for operating a speech recognition system as claimed in claim 15, wherein the transferred text comprises automatically supplying words which have been detected as being new short-message words in the vocabulary.

18. A method for operating a speech recognition system as claimed in claim 17, wherein the vocabulary and automatically supplied new words are stored in a first memory area of a vocabulary and phrase memory, and wherein manually inputted new words are stored in a second, separate memory area of the vocabulary and phrase area, such that the automatically supplied new words can replace elements of the basic vocabulary, but manually inputted words cannot.

19. A method for operating a speech recognition system as claimed in claim 18, further comprising the steps of:

storing elements of the vocabulary with a respective statistical characteristic variable;

subjecting the detected new words to statistical evaluation in order to acquire a new statistical characteristic variable; and substituting elements of the vocabulary by new words as a function of a result of a comparison of the new statistical characteristic variable with a respective statistical characteristic variable affiliated with a particular element.

20. A method for operating a speech recognition system as claimed in claim 16, wherein manually inputted new words and elements of the vocabulary are stored with an assignment of one of voice instructions and metaphors, and are displaced, together with further associated words, for selection within a scope of a menu prompting system during operation of the speech recognition system after the respective one assigned voice instruction and metaphor has been input.

* * * * *